(12) United States Patent
Rundo et al.

(10) Patent No.: US 11,164,315 B2
(45) Date of Patent: Nov. 2, 2021

(54) IMAGE PROCESSING METHOD AND CORRESPONDING SYSTEM

(71) Applicant: STMicroelectronics S.r.l., Agrate Brianza (IT)

(72) Inventors: Francesco Rundo, Gravina di Catania (IT); Sabrina Conoci, Tremestieri Etneo (IT); Giuseppe Luigi Banna, Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 78 days.

(21) Appl. No.: 16/687,207

(22) Filed: Nov. 18, 2019

(65) Prior Publication Data

US 2020/0184648 A1 Jun. 11, 2020

(30) Foreign Application Priority Data

Dec. 5, 2018 (IT) .................. 102018000010833

(51) Int. Cl.
  *G06T 7/00* (2017.01)
  *G06K 9/62* (2006.01)
  *G06N 3/04* (2006.01)
  *G06N 3/08* (2006.01)
  *G06T 11/00* (2006.01)

(52) U.S. Cl.
  CPC .......... *G06T 7/0016* (2013.01); *G06K 9/6267* (2013.01); *G06N 3/0454* (2013.01); *G06N 3/08* (2013.01); *G06T 11/003* (2013.01); *G06T 2207/10081* (2013.01); *G06T 2207/20081* (2013.01); *G06T 2207/20084* (2013.01); *G06T 2207/30061* (2013.01); *G06T 2207/30096* (2013.01)

(58) Field of Classification Search
  None
  See application file for complete search history.

(56) References Cited

U.S. PATENT DOCUMENTS

| 2010/0002929 A1* | 1/2010 | Sammak | G06K 9/00127 382/133 |
|---|---|---|---|
| 2010/0010343 A1* | 1/2010 | Daghighian | A61B 6/4057 600/436 |

(Continued)

OTHER PUBLICATIONS

Tiao, Louis C., "A Tutorial on Variational Autoencoders with a Concise Keras Implementation", Jan. 23, 2018, 14 pages, retrieved from the Internet: https://tiao.io/post/tutorial-on-variational-autoencoders-with-a-concise-keras-implementation.

(Continued)

*Primary Examiner* — Jiangeng Sun
(74) *Attorney, Agent, or Firm* — Slater Matsil, LLP

(57) ABSTRACT

A method includes receiving a time series of slice images of medical imaging. The images have a region of interest located at a lung lesion. The method also includes tracking over at least one subset of slice images in a time series of slice images variations over time of at least one image parameter at the set of points in the region of interest. Classifier processing is applied to set of signals indicative of tracked time variations of the at least one image parameter at respective points in the set of points. A classification signal is indicative of the tracked time variations of the at least one image parameter reaching or failing to reach at least one classification threshold.

20 Claims, 8 Drawing Sheets

(56) References Cited

U.S. PATENT DOCUMENTS

| | | | | |
|---|---|---|---|---|
| 2010/0108896 | A1* | 5/2010 | Surti | G01T 1/00 250/363.04 |
| 2010/0111386 | A1 | 5/2010 | El-Baz | |
| 2012/0219200 | A1 | 8/2012 | Reeves et al. | |
| 2020/0085382 | A1* | 3/2020 | Taerum | G06T 7/30 |
| 2020/0167930 | A1* | 5/2020 | Wang | G06T 7/0012 |

OTHER PUBLICATIONS

Keng, Brian, "Semi-supervised Learning with Variational Autoencoders", Sep. 11, 2017, 12 pages, retrieved from the Internet: http://bjlkeng.github.io/posts/semi-supervised-learning-with-variational-autoencoders.

Postmus, P. E., et al., "Early and locally advanced non-small-cell lung cancer (NSCLC): ESMO Clinical Practice Guidelines for diagnosis, treatment and follow-up", Annals of Oncology, vol. 28 (Supplement 4), Jul. 2017, 21 pages.

Abadi, Agus Maman, et al., "Detection of Lung Cancer using Radiograph Images Enhancement and Radial Basis Function Classifier", 10th International Congress on Image and Signal Processing, BioMedical Engineering and Informatics (CISP-BMEI), Shanghai, 2017, 6 pages.

S. Avinash, et al., "Analysis and Comparison of Image Enhancement Techniques for the Prediction of Lung Cancer", 2nd IEEE International Conference on Recent Trends in Electronics Information & Communication Technology (RTEICT), May 19-20, 2017, India, 5 pages.

Bengio, Yoshua, "Learning Deep Architectures for AI", Foundations and Trends® in Machine Learning, vol. 2, No. 1, Jan. 2009, 56 pages.

Jin, Taolin, et al., "Learning deep spatial lung features by 3D convolutional neural network for early cancer detection", International Conference on Digital Image Computing: Techniques and Application (DICTA), Nov. 29-Dec. 1, 2017, 6 pages.

S. Kalaivani, et al., "Lung Cancer Detection Using Digital Image Processing and Artificial Neural Networks", International Conference on Electronics, Communication and Aerospace Technology (ICECA), Apr. 2017, 4 pages.

G. Niranjana, et al., "A Review on Image Processing Methods in Detecting Lung Cancer using CT Images", 2017 International Conference on Technical Advancements in Computers and Communications (ICTACC), Apr. 10-11, 2017, 8 pages.

* cited by examiner

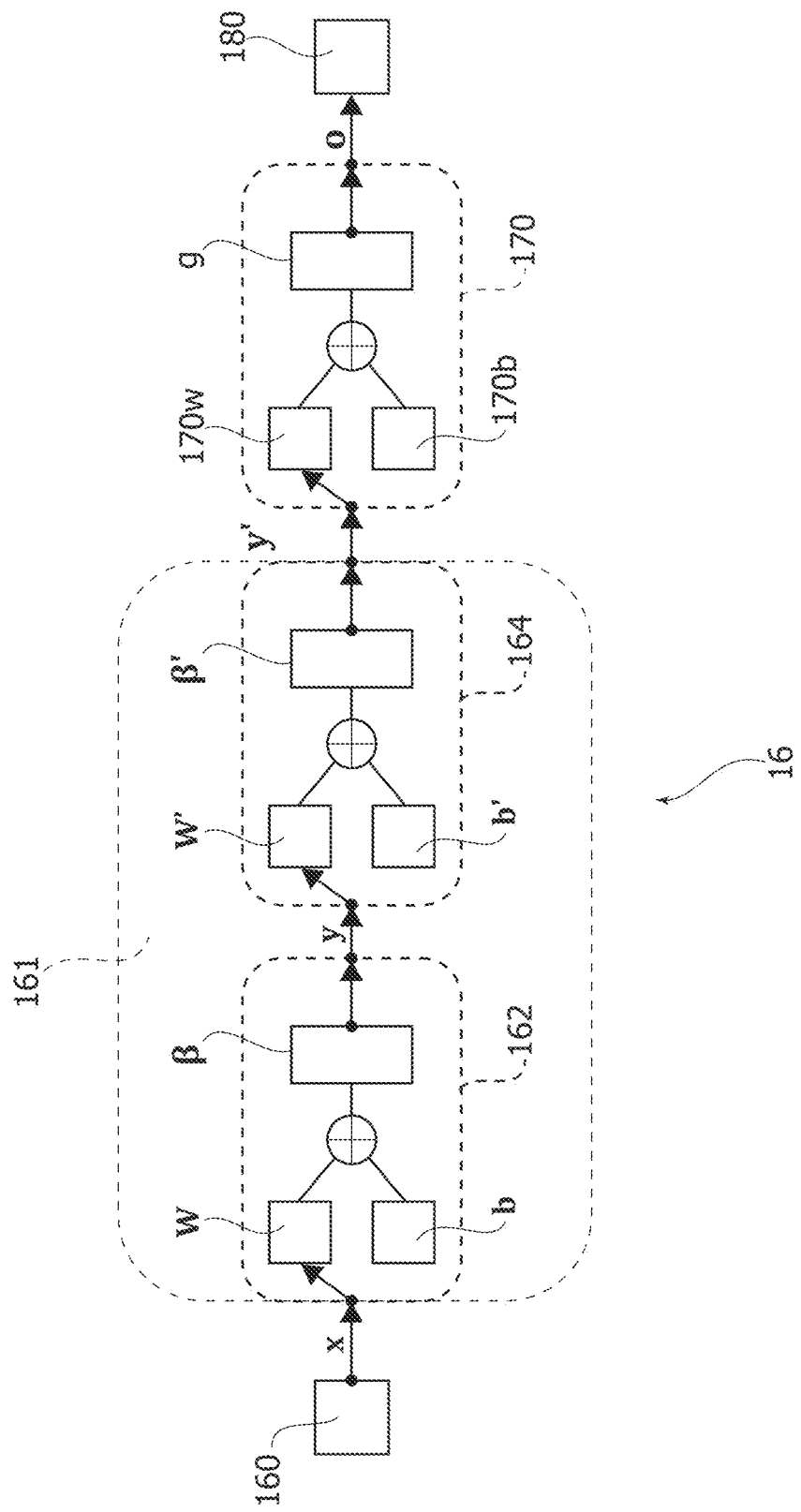

IMAGE PROCESSING METHOD AND CORRESPONDING SYSTEM

CROSS-REFERENCE TO RELATED APPLICATIONS

This application claims priority to Italian Patent Application No. 102018000010833, filed on Dec. 5, 2018, which application is hereby incorporated herein by reference.

TECHNICAL FIELD

The description relates to image processing techniques.

BACKGROUND

The capability of analyzing lung tissue lesions in order to differentiate malignant lesions (cancer or pre-cancer condition) over suspect benign ones may play a significant role in healthcare-based applications.

One of the major issues for physicians, such as oncologists, in the treatment and follow-up of pulmonary diseases is an adequate classification of lung lesions, e.g., being able to identify the lesion as having or not having oncological relevance as soon as possible ("early detection").

Guidelines for the diagnosis and treatment of thoracic neoplasms of the Italian (AIOM) and of the European Society of Medical Oncology (ESMO) identify early detection as a valuable approach to detecting the disease at an earlier, asymptomatic and potentially curable stage: see, e.g., P. E. Postmus, K. M. Kerr, M. Oudkerk, S. Senan, D. A. Waller, J. Vansteenkiste, C. Escriu, S. Peters, on behalf of the ESMO Guidelines Committee; Early and locally advanced non-small-cell lung cancer (NSCLC): ESMO Clinical Practice Guidelines for diagnosis, treatment and follow-up, *Annals of Oncology*, Volume 28, Issue suppl_4, 1 Jul. 2017, Pages iv1-iv21, https://doi.org/10.1093/annonc/mdx222.

One of the diagnostic tests for lung cancer is (fiber optic) bronchoscopy, often extended with the evaluation of regional lymph nodes by EndoBronchial UltraSound (EBUS) and/or Endoscopic UltraSound (EUS).

In most cases, these tests may facilitate diagnosing Non-Small-Cell Lung Cancer (NSCLC) without the ability of providing a detailed sub-classification.

Therefore, early classification of a lung lesion and its early oncological characterization may facilitate increasing the chances of cancer remission.

Among medical imaging processes, a Computed (Axial) Tomography scan (briefly, CAT scan or CT scan) of the chest facilitates to collect a large number of single medical images on the transverse or axial body plane called "slices" or sections. Such images facilitate visualizing the internal parts of the rib cage, specifically both lungs parenchyma. A time series of such images may provide a moving picture of the chest internal pails. Techniques known as Low-dose CT or LDCT use less ionizing radiation than a conventional CT scan.

A single CAT scan slice may include an image, typically 8-bit or 16-bit grayscale image, for instance a matrix comprising m rows and n columns of numbers.

A CAT scan may provide as a result a moving picture whose still frames are the slices, comprising the various image-acquisition phases.

Images collected via CT scan may facilitate visualization of, for instance, adhesions of the lungs to the surrounding thoracic structure or the structure of the main bronchi.

CT scanning combines x-ray equipment with computers to produce multiple, cross-sectional images or pictures of the inside of the body.

While CAT scan facilitates visualizing lung lesions, biopsy is still regarded as the de facto standard for diagnosis insofar as discriminating lung lesions via imaging alone is not held to provide a satisfactory level of reliability.

Thoracic biopsies, may be particularly invasive and dangerous, so that oncological characterization of lung lesions continues to be a problem. For instance, echo-guided thoracic biopsies of the lungs are practiced only for lesions exceeding 1 cm as max diameter.

The possibility of providing technical assistance to medical diagnosis has been investigated to some extent.

For instance, using classical CT slices image feature pipelines to differentiate malignant lung lesion has been proposed. Also, certain proposed procedures perform semi-automatic classification of based on deep learning or machine learning algorithms applied to the classical CT slices images.

A general survey of recent developments in that area is provided, e.g., in G. Niranjana and M. Ponnavaikko: "A Review on Image Processing Methods in Detecting Lung Cancer Using CT Images", International Conference on Technical Advancements in Computers and Communications (ICTACC), Melmaurvathur, 2017, pp. 18-25, doi: 10.1109/ICTACC.2017.16.

Other documents of interest include:

A. M. Abadi, D. U. Wutsqa and L. R. Pamungkas: "Detection of lung cancer using radiograph images enhancement and radial basis function classifier", 10th International Congress on Image and Signal Processing, BioMedical Engineering and Informatics (CISP-BMEI), Shanghai, 2017, pp. 1-6, doi: 10.1109/CISP-BMEI.2017.8302052;

S. Avinash, K. Manjunath and S. Senthilkumar: "Analysis and comparison of image enhancement techniques for the prediction of lung cancer", 2nd IEEE International Conference on Recent Trends in Electronics, Information & Communication Technology (RTEICT), Bangalore, 2017, pp. 1535-1539, doi: 10.1109/RTEICT.2017.8256855;

T. Jin, H. Cui, S. Zeng and X. Wang: "Learning Deep Spatial Lung Features by 3D Convolutional Neural Network for Early Cancer Detection", International Conference on Digital Image Computing: Techniques and Applications (DICTA), Sydney, NSW, 2017, pp. 1-6, doi: 10.1109/DICTA.2017.8227454;

S. Kalaivani, P. Chatterjee, S. Juyal and R. Gupta: "Lung cancer detection using digital image processing and artificial neural networks", International conference of Electronics, Communication and Aerospace Technology (ICECA), Coimbatore, 2017, pp. 100-103, doi: 10.1109/ICECA.2017.8212773.

Various solutions proposed in the literature may be exposed to one or more of the following drawbacks:
classical analytic methods may not perform satisfactorily;
a training-set or CPU intensive/consuming artificial neural network (ANN) learning phase may be required, e.g., in the use of convolutional neural networks;
when based on healthy controls (HC), lesion image features show the typical limitations of approaches related on healthy controls features;
the results may show low sensitivity/specificity ratio or be incorrect when dealing with classification of low-sized lesions, e.g., having radius between 1 and 1.5 cm (1 cm=1 centimeter=$10^{-2}$ m);

follow-up of the analyzed lung lesion is not provided or, if provided, is affected by issues of image registration, that is synchronizing two sets of CT scan slices taken at distinct times;

image processing may not take into account the physiological evolution of the cancer cells;

the results may exhibit normal sensitivity/specificity ratio with respect to high computational costs.

SUMMARY

The description relates to image processing techniques. One or more embodiments may be applied in the medical field, for instance, for the oncological characterization of lung lesions. One or more embodiments may be used in support to diagnostic activity by medical practitioners.

One or more embodiments can contribute in providing improved solutions compared with the prior art.

A method for performing lung lesion discrimination from medical images collected via CT scan by analyzing a moving picture of the lesion may be exemplary of such a method.

One or more embodiments may relate to a corresponding system.

One or more embodiments may relate to the method as a computer-implemented method.

One or more embodiments may comprise a computer program product loadable in the memory of at least one processing circuit (e.g., a computer) and comprising software code portions for executing the steps of the method when the product is run on at least one processing circuit. As used herein, reference to such a computer program product is understood as being equivalent to reference to computer-readable medium containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may involve a pipeline configured for processing moving pictures or time-series of images collected via medical imaging, e.g., via CT scan or based on the use detectors such as, e.g., of Silicon Photo-Multiplier (SiPM) detectors.

One or more embodiments may provide support to diagnostic activity in the medical field by facilitating discerning whether a lung lesion is benign or malign. Hence, one or more embodiments may avoid resorting to invasive biopsy, reducing the impact of invasive procedures. One or more embodiments may facilitate early detection of a malign lung lesion from atypical/suspect ones and support a physician in directing towards performing invasive tests solely when oncologically relevant.

One or more embodiments thus facilitate obtaining information (data, physical quantities) from the living human or animal body, e.g., in support the diagnostic activity of a human in medical and veterinary activities or for other possible uses.

One or more embodiments may exploit the morphovolumetric evolution of the lung lesions collected via medical imaging, e.g., in a thoracic (low dose) CT scan.

One or more embodiments may facilitate and support the activity of a physician in identifying type of lesion as well as assessing oncological risk to cancer progression.

One or more embodiments may be applied to a portion of slice images, also called Region-Of-Interest (ROI) of the slice.

In one or more embodiments, the ROI may be indicated by a user, e.g., by a physician such as an oncologist, indicating areas worth of further analysis. One or more embodiments may comprise a set of slice images which comprise the portion that has been indicated by the user.

One or more embodiments may be applied to a sub-set of slices in which a lung lesion is visible. One or more embodiments may comprise selecting the sub-set of slice images in the time-series of slice images as a function of an input position and region of the lung lesion in at least one of the slice images.

One or more embodiments may rely on the observation by the inventors that lesion tissue histology may influence the dynamic morpho-volumetric evolution of the lesion in images-collected or acquired via CT scan. For instance, malign lesions may have a certain dynamic, e.g., chaotic and irregular, while benign lesions may have another dynamic, e.g., uniform and regular.

One or more embodiments may use analysis of geometric parameters, of the lung lesion in synergy with analysis of the dynamic morpho-volumetric dimensional variation of the lung lesion in the set of slices collected or acquired via medical imaging in which the lesion is visible.

One or more embodiments may offer one or more of the following advantages:

simple implementation in the firmware of embedded systems (e.g., based on a STM32 platform as currently available with companies of the STMicroelectronics group);

high speed computation;

high accuracy with respect to low complexity;

high sensitivity/specificity ratio versus low complexity design;

CT slices registrations not required, leading to easy follow-up/screening;

very high discrimination capability in low-sized lung lesion (e.g., below having radius below two centimeters), it takes into account cancer cells histology as it is embedded on dynamic evolution during medical imaging acquisition;

avoids complex training, e.g., as it uses a simple CT device calibration with a single CT scan acquisition.

The claims are an integral part of the technical teaching provided herein with reference to the embodiments.

BRIEF DESCRIPTION OF THE DRAWINGS

One or more embodiments will now be described, by way of non-limiting example only, with reference to the annexed figures, wherein:

FIG. 4 is a diagram exemplary of possible details of implementation of embodiments;

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

Figure 1:
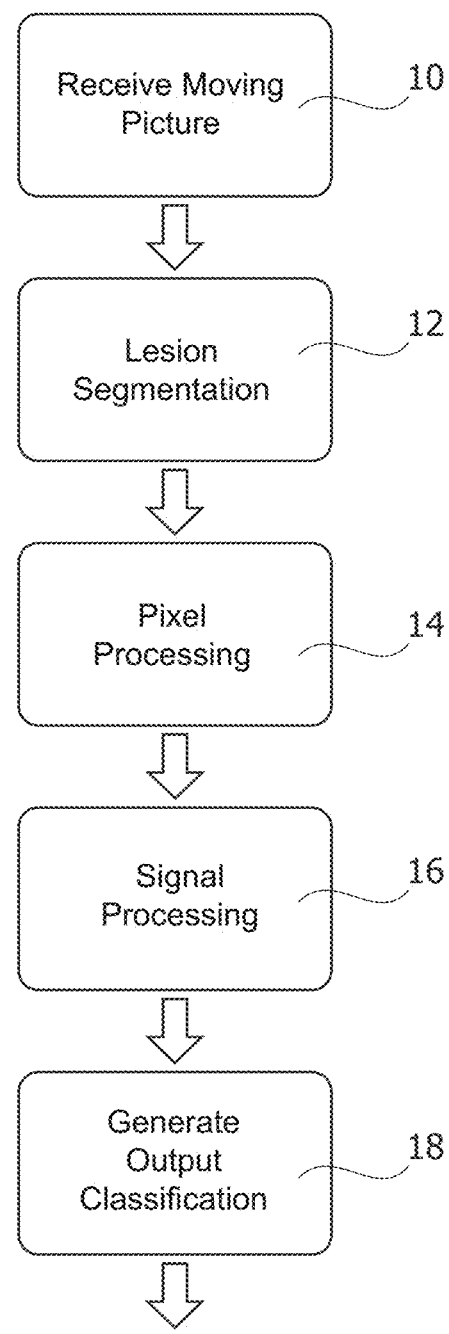
FIG. 1 is generally exemplary of embodiments of a method for classifying (discriminating) lung lesions as disclosed herein.

By way of general reference, FIG. 1 is exemplary of a method 100 for classifying (or discriminating) lung lesions, e.g., small lung lesions such as lung lesions with radius below 2 cm (1 cm=1 centimeter=$10^{-2}$ m), including acts such as:

10: receiving a moving picture comprising a time series of slice images of a lung parenchyma exhibiting a lung lesion to be evaluated, e.g., acquired or collected via CT scan;

12: lesion segmentation by selection of a region of interest (briefly, ROI) having a fixed size in at least one slice image in the moving picture, with possible smoothing processing applied thereto;

1.4.: processing each pixel in the segmented region of interests, generating a set of signals, each signal indicative of time variation of parameters of a pixel for each pixel belonging to the ROI, 16: processing to the set of signals, for instance comprising applying artificial neural network to the set of signals;

18: generating an output classification signal for the lesion analyzed as a result of processing the set of signals.

Such a classification signal may thus be evaluated by a medical practitioner (e.g., a physician) as possible input in support of his or her diagnostic activity.

The method 100 as exemplified herein may include, e.g., a stage 120 of selecting a set of slice images as a function of an input position and region A of the lung lesion L in at least one of the slice images S. For instance, such a stage 120 may comprise providing identification (e.g., by a physician) of an area A of a CT scan slice image S, e.g., of a patient's chest, having a lesion L to be evaluated, with possible activity by the physician.

Figure 2:
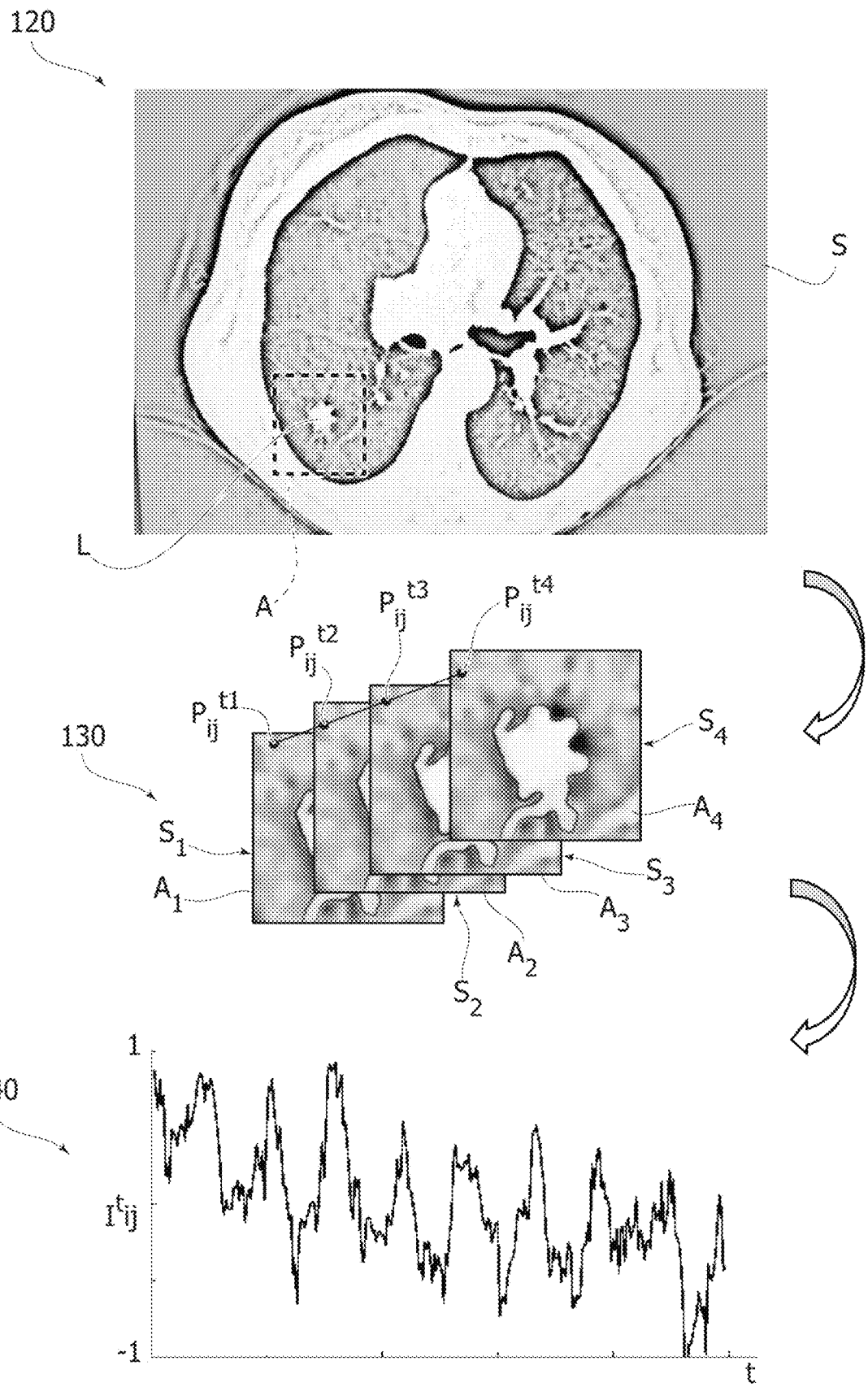
FIG. 2 is an exemplary representation of one or more embodiments.

FIG. 2 is an exemplary diagram of an anatomic chest diagram representative of a slice image S retrieved, for instance at a stage 120, via CT scan, for example low dose chest CT scan (briefly, LDCT). During a LDCT scan exam, a set of slice images is collected, for instance for the whole chest length. For instance, the set of images may be on a same axial plane or on multiple planes (sagittal, distal . . . ).

Once put together in a time series, the set of slice images may form a moving picture, e.g., the delivered CT scan. Conversely, each slice image S in the set of slice images may be obtained by time-sampling a moving picture obtained by CT scan in individual non-time-overlapping still frames.

As mentioned in the foregoing, the slice image S may be treated like a matrix S of points or pixels, the matrix S having a number of pixels proportional to the product of the number n of rows times the number m of columns in the matrix.

For instance, an individual pixel in a slice image S may be indexed by indices indicated by letters i and j, where i has values between 1 and n, while j has values between 1 and m. In the considered example, an individual pixel $p_{ij}$ may contain a numeric value, e.g., in binary notation, indicative of a level of grayscale value, e.g., $p_{11}$=00000000 may indicate the pixel is black.

In one or more embodiments, a slice image S in the set of slice images retrieved at 120, as exemplified in FIG. 1, may comprise an indication, e.g., provided by a physician such as an oncologist, of an area or region of interest A, e.g., in the lungs parenchyma, comprising a lung lesion L.

In one or more embodiments, the method as exemplified in FIG. 2 may then include:

a first set of processing stages 120, 130, 140 leading to generating a set of signals, a signal $I_{ij}$ indicative of a time-series of values indicative of a variation of parameters of an image parameter, e.g., luminance, at points $p_{ij}$ belonging to the region of interest A, and a second set of processing stages, including artificial neural network processing for providing an outcome O in the form of information in support of the physician's diagnostic activity (e.g., Lung lesion benign or malign, grade of malignity, . . . ).

It is noted that the area A may also be treated like a matrix of v rows and q columns, e.g., v=10<n and q=10<m, for a total number of 100 pixel in the area A.

For the sake of simplicity, principles underlying embodiments are discussed in the following with respect to a moving picture comprising four slice images, e.g., $S_1$, $S_2$, $S_3$, $S_4$, taken at respective time instants, e.g., $t_1$, $t_2$, $t_3$, $t_4$. Such a given number of slice images is in no way limiting, being otherwise understood that the method 100 may be applied to a moving picture having any number of slice images.

In a stage 130, as exemplified in FIG. 2, the method 100 may comprise operations of selection or segmentation of respective portions $A_1$, $A_2$, $A_3$, $A_4$ of slice images, the respective portions having a fixed size, e.g., a same size as the ROI area A provided by an input indication of the presence of a lesion L to be analyzed.

For instance:

a first portion $A_1$, comprising the lesion L identified in at least one slice S, may be segmented from a first slice image $S_1$ acquired at first time instant $t_1$;

a second portion $A_2$, comprising the lesion L identified in at least one slice S, may be segmented from a second slice image $S_2$ acquired at a second time instant $t_2$, for instance the second time instant $t_2$ being subsequent to the first time instant $t_1$;

a third portion $A_3$, comprising the lesion L identified in at least one slice S, may be segmented from a third slice image $S_3$ acquired at a third time instant $t_3$, for instance the third time instant $t_3$ being subsequent to the second time instant $t_2$;

a fourth portion $A_4$, comprising the lesion L identified in at least one slice S, may be segmented from a fourth slice image $S_4$ acquired at a fourth time instant $t_4$, for instance the fourth time instant $t_4$ being subsequent to the third time instant $t_3$.

As mentioned, each respective portion $A_1$, $A_2$, $A_3$, $A_4$ may comprise a visible portion of the lung lesion L identified in at least one slice S, hence representing a "snapshot" of the lesion L at subsequent time instants $t_1$, $t_2$, $t_3$, $t_4$.

In one or more embodiments, the method may comprise selecting a subset of selected slice images $S_1$, $S_2$, $S_3$, $S_4$ in the time-series of slice images as a function of an input position and region A of the lung lesion L in at least one of the slice images S. In the example considered, all slice images collected include the lung lesion L in the area A.

In stage 130, processing may be applied to pixels $p_{ij}$ having a same indexing (i, j) in consecutive time instants in respective portions $A_1$, $A_2$, $A_3$, $A_4$ of the selected slice images $S_1$, $S_2$, $S_3$, $S_4$.

For instance, a pixel $p_{ij}^{t1}$ in the first portion $A_1$ in the first slice image $S_1$ may be have its value "tracked" across subsequent time instants $t_1, \ldots, t_4$.

In a stage 140, further processing may be applied at pixel points $p_{ij}$ in the region of interest A, tracking the evolution of pixel parameters, e.g., pixel intensity value $I(p_{ij}^t)$, throughout time instants, e.g., by collecting the values of the intensity of pixels $p_{ij}^t$ with a same indexing in respective portions $A_1, \ldots, A_4$ of respective slice images $S_1, \ldots, S_4$ in subsequent time instants $t_1, \ldots, t_4$.

In a stage 140, as a result of such "tracking", a signal or time-series $I_{ij}^t$ may be generated. In one or more embodiments, the time-series of variations $I_{ij}^t$ may be indicative of time variation of pixel parameters, e.g., grayscale intensity of such pixel across time instants.

For instance, for a pixel point $p_{ij}$ on the i-th row and j-th column in a generic k-th time-samples area of interest $A_k$ (where in the example considered k may vary between 1 and 4), the signal $I_{ij}^t$ generated by tracking the evolution in time of the parameter, e.g., luminance, of the pixel $p_{ij}$ may be expressed as a vector having components equal to a luminance value of the pixel for each k-th time instant, e.g., in sequential order, as:

$$I_{ij}^t = [I(p_{ij}^{t1}), I(p_{ij}^{t2}), I(p_{ij}^{t3}), I(p_{ij}^{t4})]$$

As exemplified in the bottom part 140 of FIG. 2, the signal indicative of luminance in time may be plotted, e.g., interpolating a curve between data points.

For the sake of simplicity, in the following a simple case of an area of interest A comprising four pixels $p_{11}$, $p_{12}$, $p_{21}$, $p_{22}$ is discussed, being otherwise understood that such an example is in no way limiting and the method 100 may be applied to any number of pixel or points in the images.

For the sake of simplicity and to highlight principles underlying one or more embodiments, in the examples considered:

the pixels $p_{11}$, $p_{12}$, $p_{21}$ are indicative of image of cancerous cells in the area of the lesion L, while the pixel $p_{22}$ is indicative of image of non-cancerous cells in the area of the lesion L.

FIGS. 3a to 3d show a set of time-series of intensity parameter variation $I_{11}^t$, $I_{12}^t$, $I_{21}^t$, $I_{22}^t$ of respective pixels $p_{11}$, $p_{12}$, $p_{21}$, $p_{22}$ in the exemplary area A, as discussed in the foregoing. In the example considered, the parameter considered is luminance (or intensity), being otherwise understood that other parameters may be chosen.

Figure 3A:
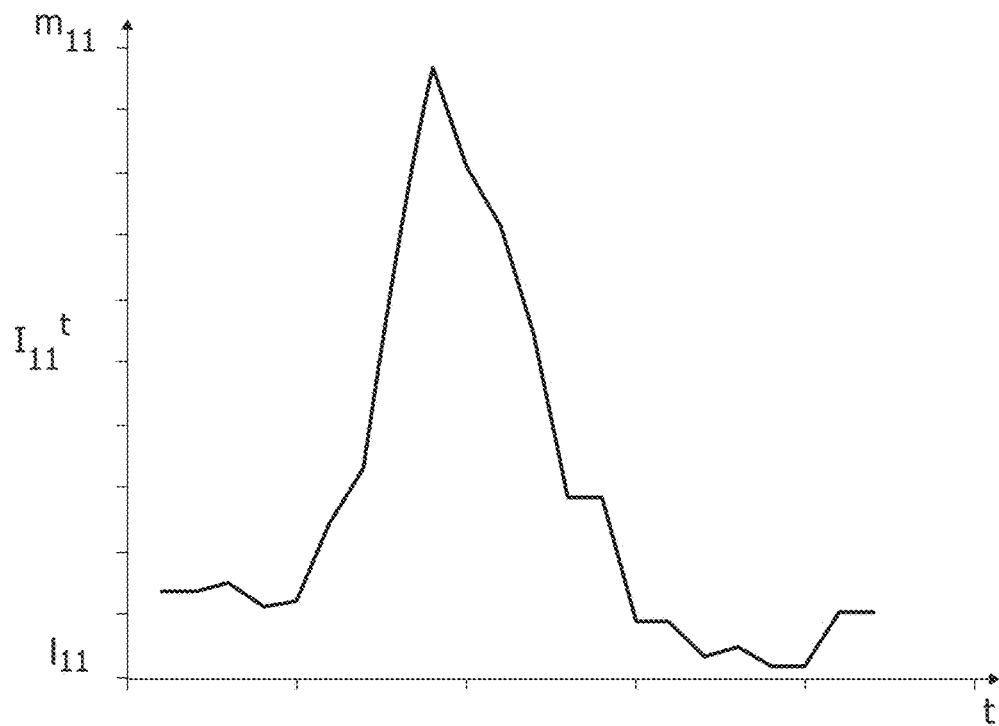
FIGS. 3a, 3b, 3c and 3d are exemplary of principles underlying operations in the method of FIG. 1.
Figure 3B:
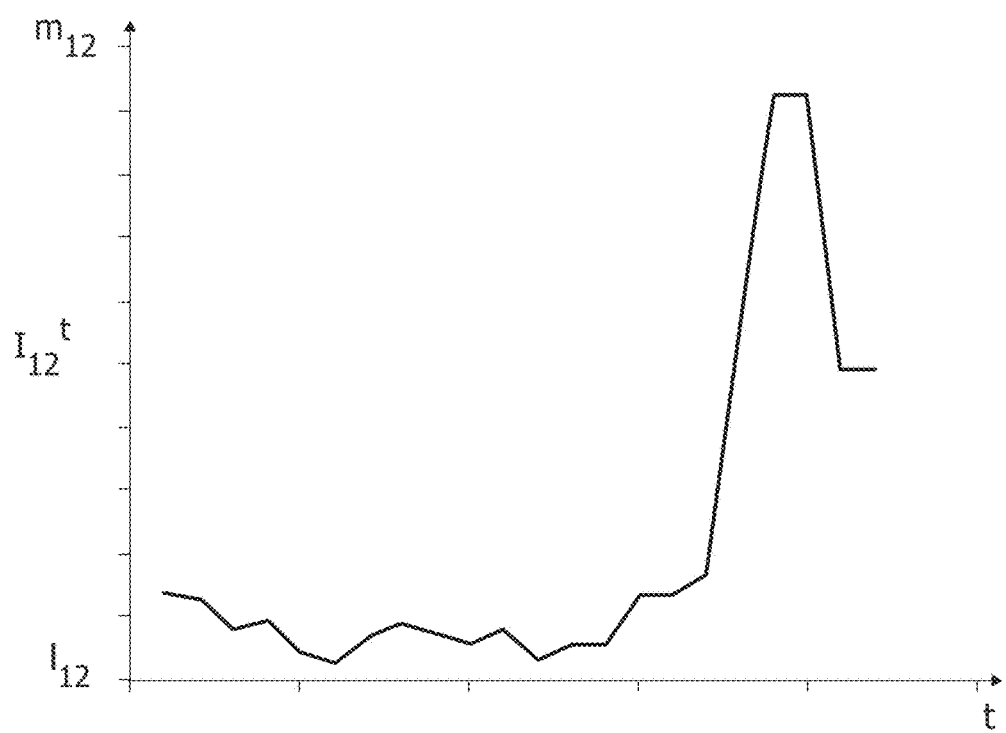
Figure 3C:
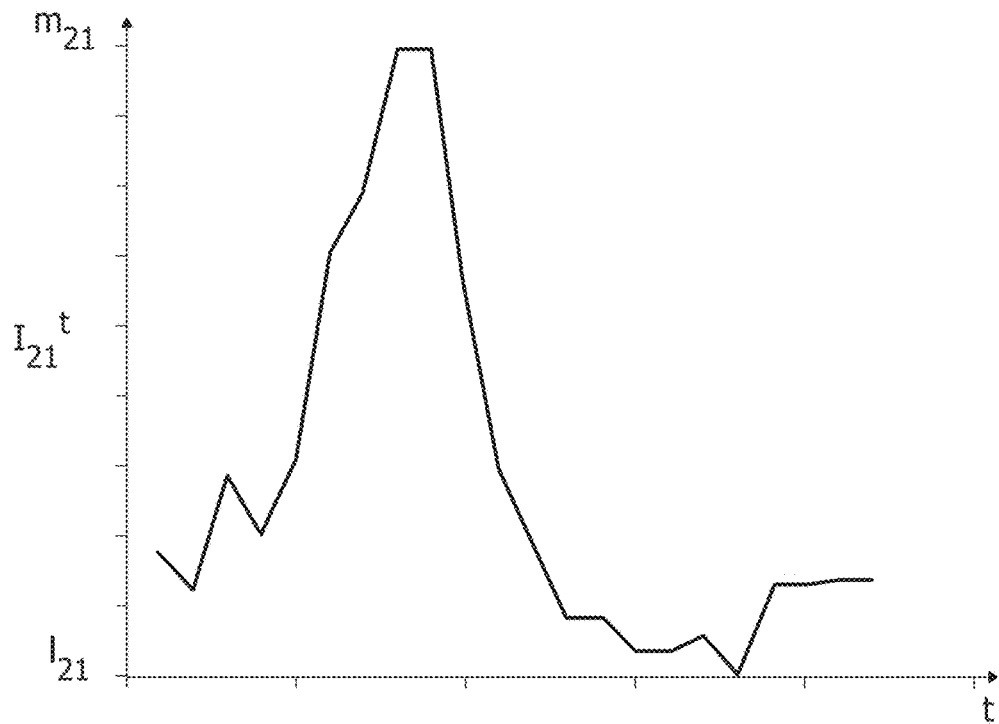
Figure 3D:
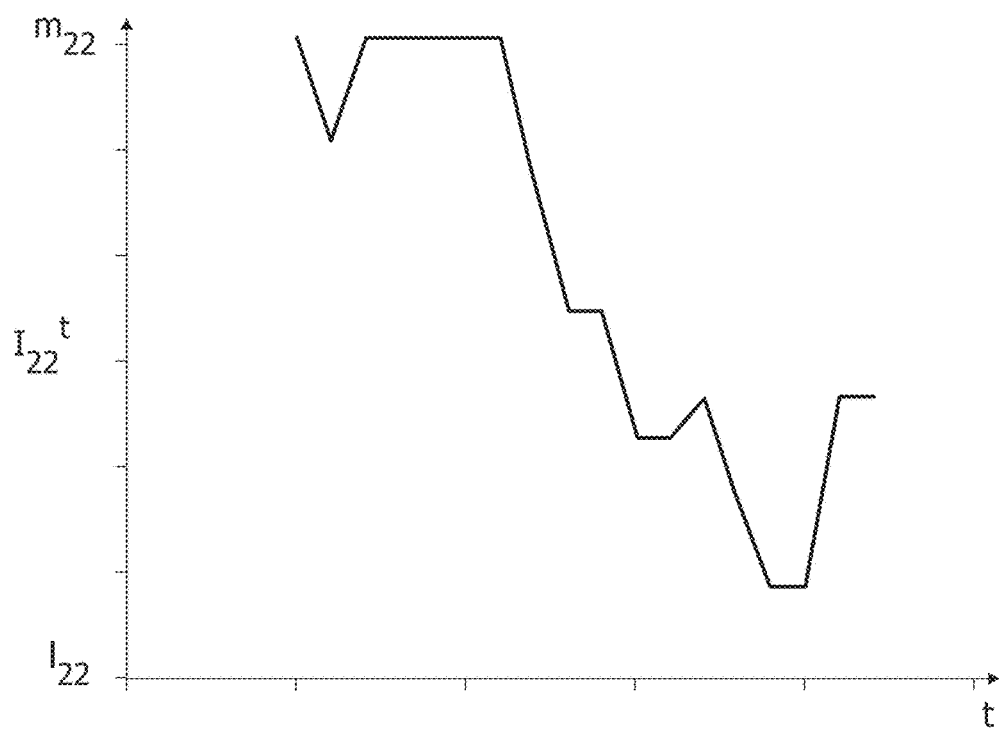
Figure 5A:
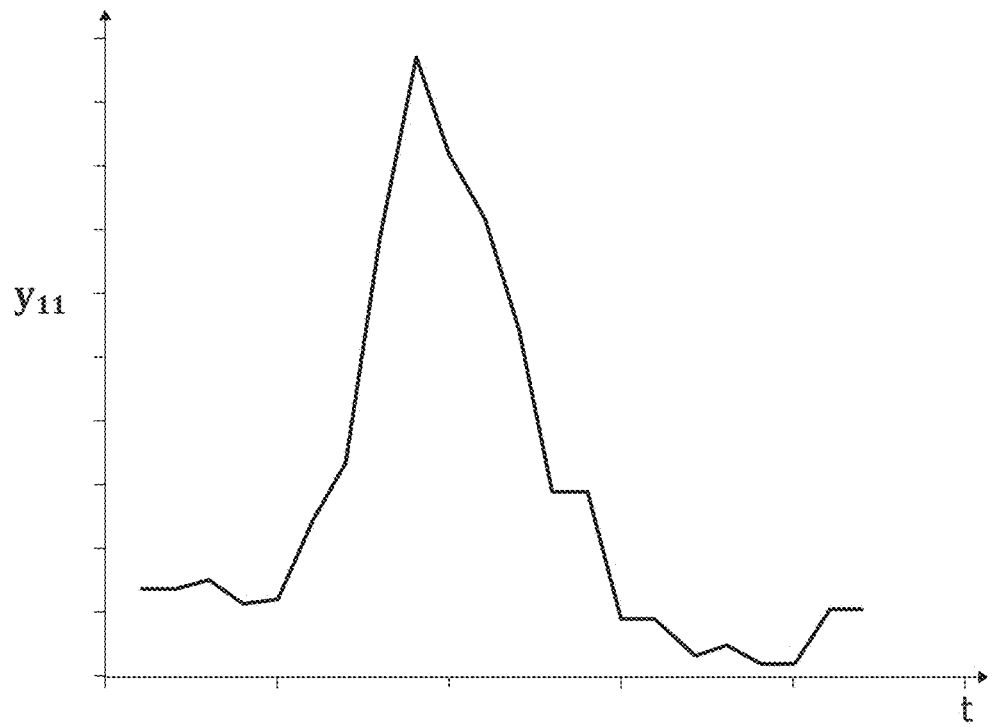
FIGS. 5a, 5b, 5c and 5d are exemplary of principles underlying operations in FIG. 4.
Figure 5B:
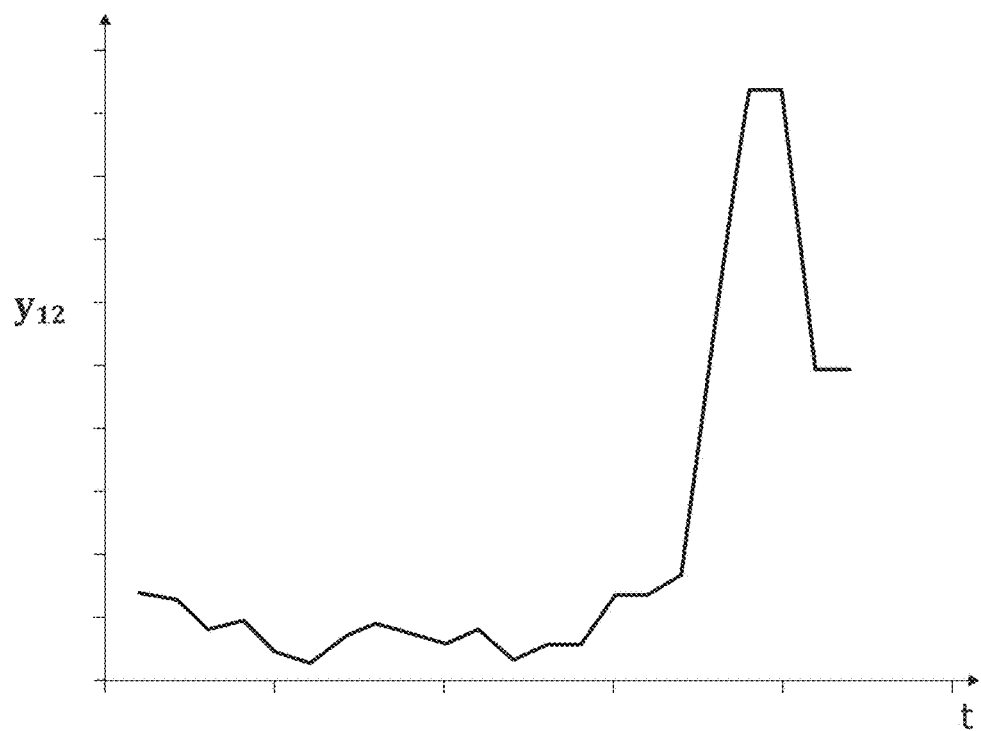
Figure 5C:
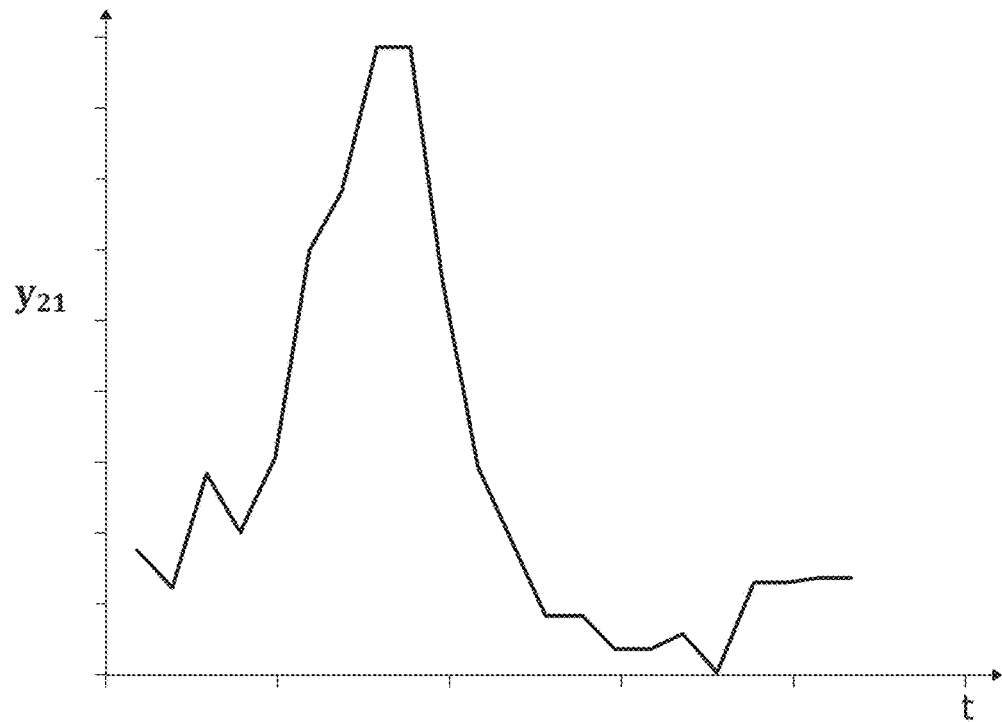
Figure 5D:
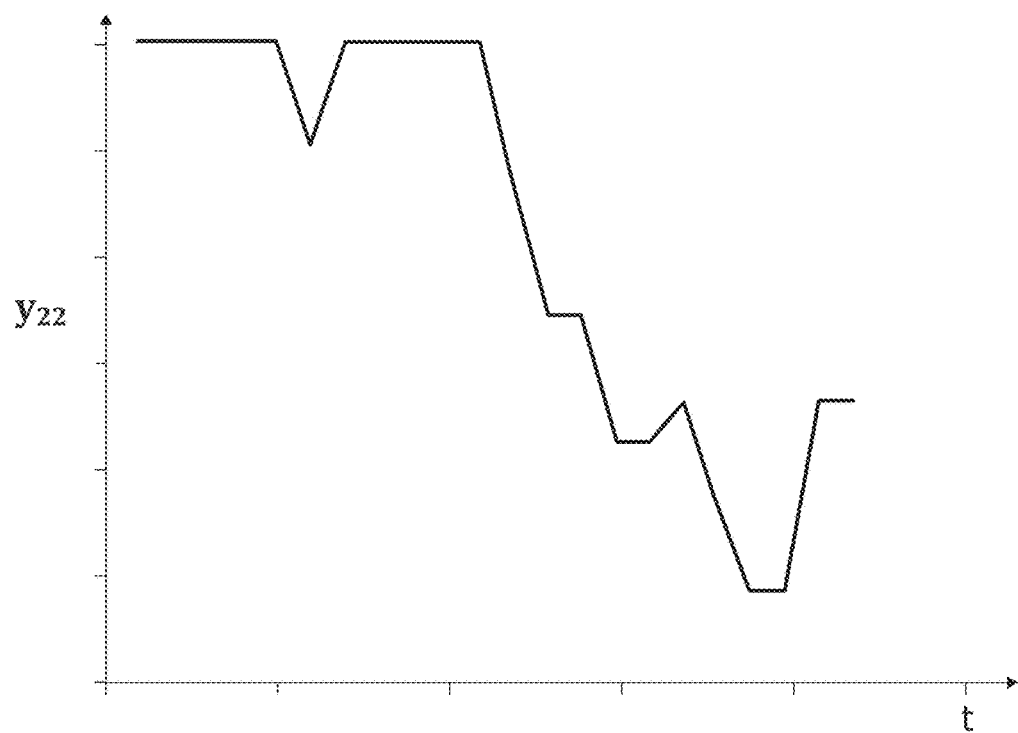

Specifically, in the example considered:

FIG. 3a shows a First signal $I_{11}^t$ of intensity in time for a first pixel $p_{11}$, imaging a portion of the lung lesion L;

FIG. 3b shows a second signal $I_{12}^t$ of intensity in time for a second pixel $p_{12}$, imaging a portion of the lung lesion L;

FIG. 3c shows a third signal $I_{21}^t$ of intensity in time for a first pixel $p_{21}$, imaging a portion of the lung lesion L;

FIG. 3d shows a fourth signal $I_{22}^t$ of intensity in time for a first pixel $p_{22}$, imaging a portion of the normal parenchyma in the area of interest A.

For instance, FIGS. 3a to 3d represent a number of intensity data points sampled at a respective number of time instants, e.g., 22 time-samples, interpolated to plot respective functions $I_{11}^t$, $I_{12}^t$, $I_{21}^t$, $I_{22}^t$ in time t.

The individual signals have ranges within which the intensity varies. For instance:

$I_{11}$, $m_{11}$ are, respectively, first minimum and maximum values within which the first signal $I_{11}^t$ varies in the time interval considered, e.g., $I_{11}=0.35$, $m_{11}=0.85$;

$I_{12}$, $m_{12}$ are, respectively, second minimum and maximum values within which the second signal $I_{12}^t$ varies in the time interval considered, e.g., $I_{12}=0.35$, $m_{12}=0.85$;

$I_{21}$, $m_{21}$ are, respectively, third minimum and maximum values within which the third signal $I_{21}^t$ varies in the time interval considered, e.g., $I_{21}=0.35$, $m_{21}=0.8$;

$I_{22}$, $m_{22}$ are, respectively, fourth minimum and maximum values within which the fourth signal $I_{22}^t$ varies in the time interval considered, e.g., $I_{22}=0.88$, $m_{22}=1$.

Inventors have observed that in general signals of intensity variation $I_{11}^t$, $I_{21}^t$, $I_{22}^t$ related to the pixels $p_{11}$, $p_{21}$, $p_{22}$ imaging a portion of lesion L having oncologically relevant characteristics, are different, e.g., have a wider variability range, than the signals of intensity variation in time $I_{22}^t$ related to pixels $p_{22}$ imaging non-cancerous portions of the lesion L. Hence, such signals may be processed to provide information about the lung lesion status, e.g., whether its image is indicative of a benign or malign condition, possibly also with the indication of the grade of malignity.

In one or more embodiments, stage 140 provide as a result the set of signals of pixel parameters variation in time $I_{11}^t$, $I_{12}^t$, $I_{21}^t$, $I_{22}^t$ (briefly expressed as x in the following) which may be processed in a processing stage 16, for instance by applying Artificial Neural Network (briefly, ANN) processing. For instance, the set of signals of pixel parameters variations in time $\{I_{ij}^t\}$ may be shaped as an array of input values, e.g., $x=\{I_{ij}^t\}$.

FIG. 4 is an exemplary diagram of a possible network topology of an artificial neural network (or machine learning) processing stage 16 configured to classify, e.g., one by one, intensity signals the set of signals of pixel parameters variations in time x.

In one or more embodiments, processing methods such as those disclosed in Yoshua Bengio (2009), "Learning Deep Architectures for AI", Foundations and Trends® in Machine Learning: Vol. 2: No. 1, pp 68-95. (http://dx.doi.org/10.1561/2200000006) may be found suitable for artificial neural network processing 16.

In one or more embodiments, applying neural network processing 16 may comprise an artificial neural network (briefly, ANN) processing pipeline, e.g., in a feed-forward pipeline, comprising:

an input layer 160, configured to receive the set of signals of pixel parameters variations in time x, a first processing layer 162, coupled to the input layer 160, configured to receive the set of signals of pixel parameters variations in time x and provide a first set of latent representations y and a first subset of, e.g., self-learned, features W in the set of pixel parameters variations in time x;

a second processing layer 164, coupled to the first processing layer 162, configured to receive such set of latent representations y and provide a second set of latent representations y' and a second subset of, e.g., self-learned, features W', e.g., self-learned in the set of pixel parameters variations in time x.

a third processing layer 170, coupled to the second processing layer 164, configured to apply classification processing to such set of signals of pixel parameters variations in time x, e.g., clustering the signals as a function of such sets of features, and an output layer 180, coupled to the third processing layer 170, configured to provide a classification signal, e.g., indicative of the set of signals of pixel parameters variations in time x time variations reaching or failing to reach at least one classification threshold.

The input layer 160 and the output layer 180 may be indicative of a number of "slots" or "perceptrons" available for input or output in the ANN stage 16. For instance, the input layer 160 may provide space for a number of input data, e.g., for a number k of input data points equal to the number of intensity data samples, e.g., k=22.

In one or more embodiments, the input layer 160 may provide space for a number of input data points sized equal to the number of pixel points in the ROI area A to analyze, e.g., for a number k of input data points k=100.

In one or more embodiments, the first 162 or second 164 or third 170 layer may comprise so-called "hidden layers" in which perceptrons coupled to other neurons in the network and hence not directly accessible from input and output layers, which indicate that processing may occur with a higher number and more complex architecture of perceptrons than in a single layer, for instance in order to process in parallel all the pixels in the area of interest A, e.g., by using 50 hidden layers.

In one or more embodiments, the first processing layer 162 and the second processing layer 164 may have a likewise Multi-Layer Perceptron (briefly, MLP) architecture, having a set of n hidden layers, for instance n=50 hidden layers.

A single i-th perceptron $\varphi_i$, e.g., in the first processing layer 162, may be identified in the set of n perceptrons by a tuple of values $\varphi_i=(w_i, b_i, \beta_i)$, comprising a weight value $w_i$ and an offset value $b_i$ and an activation function $\beta_i$.

In one or more embodiments, for instance, for respective first 162 and second 164 layer:
- a set of weighting values is indicated with W, W'
- a set of bias values is indicated with b, b',
- a set of activation functions is indicated with $\beta$, $\beta'$.

It is noted that even if the symbols used are different, the values and functions may be the same for the first 162 and second layers 164, e.g., first and second layer may have a same activation function set $\beta'=\beta$.

In one or more embodiments, the sets of activation function comprise sigmoid functions, for instance as $$\beta(x) \to \text{Sigmoid} \to (1+e^{-x})^{-1})$$

where x is the set of input values.

In one or more embodiments, the first and second processing stages 162, 164 may implement Stacked AutoEncoder (briefly, SAE) processing 161, with the purpose of learning to recognize patterns and providing features in the set of signals x, e.g., in an unsupervised manner.

In one or more embodiments, the first processing stage 162 may implement a first AutoEncoder ANN (briefly, encoder) while the second processing stage 164 may implement a second encoder.

In one or more embodiments, the first processing stage 162 may provide as a result y a so-called "latent representation" of the processed input signals indicative of, e.g., internal mapping of, the morpho-volumetric dynamic of the imaged portion of lung lesion L in the area of interest A.

In one or more embodiments, the second processing stage 162 may provide as a result y' a further latent representation, e.g., a further internal mapping, of the processed latent representation y of the processed input signals.

The encoder stages 162, 164 in the SAE stage 161 learn to compress data x from the input layer 160 into a code y, and then reconstruct from that code y a set of reconstructed signals z aiming to match the original dataset x, learning autonomously and providing a set of image features, e.g., encoded in the weight values W, W', in the process.

In one or more embodiments, the first encoder 162 and the second encoder 164 in the SAE stage 161 can be expressed via respective functions $\varphi$ and $\varphi'$, identifying tuples of values of perceptrons in respective layers, e.g.:

$$\varphi=\{W,b,\beta\}; \varphi'=\{W',b',\beta'\}$$

where the boldface indicates that the symbols are vectors (e.g., having size>1).

For instance, the latent representation y may be expressed as:

$$y=\vartheta(x)=\beta(Wx+b); W \in d'xd; b \in \mathbb{R}$$

while the set of reconstructed signals z may be expressed as:

$$z=\gamma(y)=\beta(W'y+b')$$

Accordingly, the stacked auto-encoder SAE 161 may be trained to minimize reconstruction errors, e.g., squared errors, by imposing constraints on the residuals, e.g., the residual difference between reconstructed z and original x sets of signals, for instance expressed as:

$$\varphi^*, \varphi'^* = \operatorname{argmin}_{\varphi,\varphi'} \frac{1}{n}\sum_{i=1}^{n} L(x(i), z(i)) = \operatorname{argmin}_{\varphi,\varphi'} \frac{1}{n}\sum_{i=1}^{n} L(x(i), \gamma(\beta(W'x+b')))$$

where the functional L(x(i), z(i)) is a variational functional which may be expressed as:

$$L(x(i),z(i))=\Psi(\xi_x,\xi_z)=-\Sigma_{k=1}^{d}[x_k \log(z_k)+(1-x_k)\log(1-z_k)]$$

In one or more embodiments, a KLD (Kullback-Leibler Divergence) method may be found suitable for use in training the SAE ANN processing stage 161, facilitating to avoid occurring in classical over-fitting problems for the network 161 (e.g., due to limited generalization) and improving the learning performances.

Accordingly, the objective function to minimize residuals may be modified, and may be expressed as:

$$\arg \min_{\varphi,\varphi'} \Sigma_{i=1}^{n} L(x(i),\gamma(\beta(Wx(i)+b)))+\tau\Sigma_{j=1}^{H_d} \mathcal{F}_{KL}(\rho\|\hat{\rho})$$

where $\mathcal{F}_{KL}(\rho\mu\hat{\rho})$ stands for the Kullback-Leibler divergence operator, e.g., indicative of a measure of how one probability distribution $\rho$ is different from a second, reference probability distribution $\widehat{\rho_j}$, expressed as:

$$\mathcal{F}_{KL}(\rho\|\hat{\rho}) = \rho\log\frac{\rho}{\hat{\rho}_J} + (1-\rho)\log\frac{(1-\rho)}{(1-\hat{\rho}_J)}$$

implementing an Empirical Risk Minimization via Kullback-Leibler divergence.

In one or more embodiments, the learned weights W in the first encoder stage 162 may be indicative of the first subset of features W, e.g., intensity interval boundaries values variability feature, in the set of signals of pixel parameters time variations x.

In one or more embodiments, the learned weights W in the second encoder stage 162 may be indicative of the second subset of features W' in the set of signals of pixel parameters time variations x.

In one or more embodiments, a classic clustering layer, e.g., a softmax layer, is found suitable for use in the third processing stage 170.

In one or more embodiments, the third processing stage receives at least one of: the reconstructed signal z, the first latent representation y, the second latent representation y' the first set of features W and/or the second set of features W' from the SAE stage 161 and provides to the output layer 180 a grouping or clustering of the set of pixel parameters time variations x as a function in a set of classes.

In one or more embodiments, analogously to what discussed with respect to the SAE processing stage 162, 164, the third processing layer 170 may have a Multi-Layer Perceptron (briefly, MLP) architecture, having a set of n hidden layers, for instance n=50 hidden layers.

A single j-th perceptron $q_j$ in the third processing layer 170, may be identified in the set of n perceptrons by a tuple of values $q_j=(w_{kj},b_j,g_j)$, comprising a weight value $w_{kj}$, an offset value $b_j$ and an activation function $g_j$.

In one or more embodiments, for instance:

a set of weights values indicated with 170w, having values $w_{kj}$;

a set of bias values is indicated with 170b, for instance having all a zero value;

a set of activation functions is indicated with g, for instance a set of softmax functions which may be expressed as:

$$g(a_k) = \frac{e^{a_k}}{\sum_{l=1}^{K} e^{a_l}}$$

where $a_k$ may be expressed as:

$$a_k = \frac{1}{n}\sum_{j=1}^{M} w_{kj} z_j$$

The third processing stage provides a set o comprising a number of k values to the output stage 180, whose k-th value may be expressed as:

$$o_k = g(\rho_{j=1}^{M} w_{kj} \beta(\Sigma_{i=1}^{d} w_{ji} x_i))$$

as a function of individual signals $x_i$ in the set of signals of pixel parameters variations in time x.

In one or more embodiments, the third processing stage may provide as output a signal o, e.g., having a value between 0 and 1, which may be indicative of a classification signal generated in the output stage 180, which may be used to classify the image of the lesion L as either benign or malign, for instance as a function of a threshold first value:

if the output stage signal o has a value between the first value, e.g., 0.5, and a second value, e.g., 1, the lesion L is classified as malign;

if the output stage signal o has a value between the first value and a third value, e.g., 0, the lesion L is classified as benign.

In one or more embodiments, a finer classification signal o may be output in case a first classification signal is malign, e.g., providing detailed classification of the grade of malignity of the lesion L, for instance as a function of multiple thresholds.

In one or more embodiments, the third processing stage 170 may be trained on a pre-disposed training set, e.g., comprising a certain percentage of images collected, in order to learn to map adequately the set of signals to a set of classes, e.g., benign, malign, grade of malignity, etc.

One or more embodiments of the method 100 have been tested on a test ensemble of available CT collected time-series, e.g., on 50 CT scans, comprising different types of lesions, for instance:

the majority of lesions, e.g., 60%, known to be maligns (adenocarcinomas, squamous carcinoma, NSCLC, etc.);

the minority of lesions, e.g., 40%, known to be not cancerous or benign (pneumonia, angiomas, nodules of silicosis, BPO, etc.).

A sub-ensemble of the test-ensemble was used to train the ANN stages, e.g., comprising 70% of the lesion types, while the remaining ensemble, e.g., comprising 15% of the lesion types, was used for validation and testing. The accuracy rate of the method in correctly classifying known types of lesions was approximately 95%.

It is noted that what discussed in the foregoing with respect to images collected via CT scan may be applied mutatis mutandis also to images of lung lesions obtained via other medical imaging processes, e.g., known per se.

For instance, the method may also be applied to images obtained via Positron Emission Tomography (briefly, PET) scan comprising lung lesions L in areas of interest A.

One or more embodiments may involve a pipeline configured for processing signals based on the use detectors such as Silicon PhotoMultiplier detectors (SiPMs).

Figure 6:
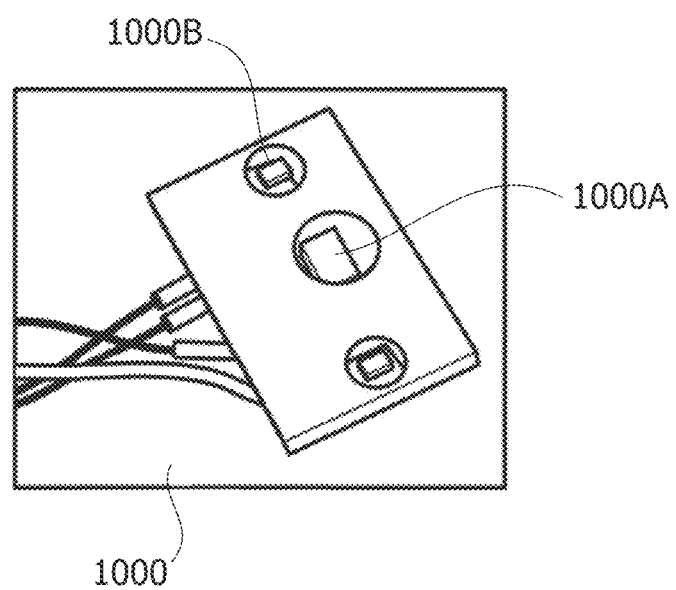
FIG. 6 is a diagram of one or more embodiments of a system as disclosed herein.

Specifically, as shown in FIG. 6, a device comprising a detector may be used in a PET scan to detect back-scattered photons and processing as discussed herein may be applied to the slice images obtained via medical imaging the signal from the detector 1000.

As shown in FIG. 6, in one or more embodiments the probe circuitry block indicated as a whole as 1000 can include a probe section 1000A and a printed circuit board (PCB) 1000B configured for interfacing the probe sections 1000A with an acquisition and processing circuit.

Such detectors 1000 may provide advantages in terms of single-photon sensitivity and high internal gain for relatively low reverse bias.

One or more embodiments as discussed herein provide improvements in medical imaging techniques by using SiPMs 1000 (as available with companies of the ST group) as optical probe sensors, adapted to be used in conjunction with hardware and software components in providing a processing pipeline 10 adapted to be used in support of diagnostic activity by a medical practitioner (e.g., a physician).

One or more embodiments may comprise a method (for instance, 100), comprising:

receiving (for instance, 10; 120) a time series of slice images (for instance, $S_1$, $S_2$, $S_3$, $S_4$) of medical imaging, the images comprising a region of interest (for instance, $A_1$, $A_2$, $A_3$, $A_4$) located at a lung lesion (for instance, L), wherein the region of interest includes a set of points (for instance, $p_{ij}^{t1}$, $p_{ij}^{t2}$, $p_{ij}^{t3}$, $p_{ij}^{t4}$);

tracking (for instance, 12; 130) over at least one subset of slice images in the time series of slice images variations over time of at least one image parameter (for instance, $I_{ij}^t$) at the set of points in the region of interest, the variations over time of the at least one image parameter being indicative of dimensional variations of the lung lesion;

generating (for instance, 14; 140) a set of signals (for instance, $I_{11}^t, I_{12}^t, I_{21}^t, I_{22}^t$; x) indicative of tracked time variations of the at least one image parameter at respective points in the set of points;

applying classifier processing (for instance, 16; 160) to the set of signals indicative of tracked time variations of the at least one image parameter at respective points in the set of points and generating (for instance, 18) a classification signal indicative of the tracked time variations of the at least one image parameter reaching or failing to reach at least one classification threshold.

One or more embodiments may comprise tracking variations over time of at least one image parameter at the set of points in the region of interest over at least one subset of slice images in the time series of slice images, the at least one subset of slice images selected out of the time series of slice images as a function of the position and/or size of the lung lesion in at least one of the slice images (for instance, S) in the time series of slice images.

In one or more embodiments:
the time series of slice images may include grayscale images, and/or
the at least one image parameter may include luminance.

In one or more embodiments, applying classifier processing to the set of signals may comprise applying artificial neural network processing (for instance, 161, 170) to the set of signals.

In one or more embodiments, the artificial neural network processing applied to the set of signals may comprise:

a first artificial neural network processing layer (for instance, 161), configured to receive the set of signals and learn a set of features (for instance, W, W', y, y') in the set of signals, and a second artificial neural network processing layer (for instance, 170), configured to provide an output classification signal (for instance, o) as a function of the set of features learned.

In one or more embodiments, the first artificial neural network processing layer may comprise stacked-auto-encoder processing, SAE, comprising:

a first encoder layer (for instance, 162), configured to receive the set of signals and provide a first set of latent representations (for instance, y) and a first subset of features (for instance, W) of respective signals in the set of signals;

a second encoder layer (for instance, 164), configured to receive the first set of latent representations and provide as output a second set of latent representations (for instance, y') and a second subset of features (for instance, W') of respective signals in the set of signals.

One or more embodiments may comprise providing the set of features in the set of signals comprises training the first artificial neural network processing layer to reduce errors between a set of reconstructed signals (for instance, z) and the set of signals, preferably via a Kullback-Leibler Divergence, KLD, empirical risk minimization processing.

In one or more embodiments, the second artificial neural network processing layer may comprise clustering the set of signals by applying a set of softmax activation functions (for instance, g).

One or more embodiments may comprise generating the region of interest (for instance, A) with a fixed size over the at least one subset of slice images in the time series of slice images.

One or more embodiments may comprise collecting the time series of slice images of medical imaging via:

Computer assisted Tomography, CT, preferably low dose CT, and/or

Positron Emission Tomography, PET.

One or more embodiments may comprise a system (for instance, 1000), comprising:

a detector (for instance, 1000A), configured to collect time-series of slice images via medical imaging, preferably a silicon photomultiplier, SiPM, processing circuitry (for instance, 1000B) coupled to the detector to receive the time series of slice images therefrom, the processing circuitry comprising artificial neural network processing circuits (for instance, 16; 160) and configured to provide an output classification (for instance, 18; 180) of the lung lesion with one or more embodiments of the method (for instance, 100).

One or more embodiments may comprise a computer program product loadable in the memory of at least one processing circuit and comprising software code portions for executing the steps of one or more embodiments of the method (for instance, 100) when the product is run on at least one processing circuit.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is determined by the annexed claims.

What is claimed is:

1. A method, comprising:
   receiving a time series of slice images of medical imaging, the slice images comprising a region of interest located at a lung lesion, wherein the region of interest includes a set of points;
   tracking, over at least one subset of slice images in the time series of slice images, variations over time of at least one image parameter at the set of points in the region of interest, the variations over time of the at least one image parameter being indicative of dimensional variations of the lung lesion;
   generating a set of signals indicative of tracked time variations of the at least one image parameter at respective points in the set of points;
   applying classifier processing to the set of signals indicative of tracked time variations of the at least one image parameter at respective points in the set of points; and
   generating a classification signal indicative of the set of signals indicative of tracked time variations of the at least one image parameter reaching or failing to reach at least one classification threshold.

2. The method of claim 1, further comprising selecting the at least one subset of slice images out of the time series of slice images as a function of position, size, or position and size of the lung lesion in at least one of the slice images in the time series of slice images.

3. The method of claim 1, wherein the time series of slice images includes grayscale images.

4. The method of claim 1, wherein the at least one image parameter includes luminance.

5. The method of claim 1, wherein applying classifier processing to the set of signals comprises applying artificial neural network processing to the set of signals.

6. The method of claim 5, wherein the artificial neural network processing applied to the set of signals comprises:
- a first artificial neural network processing layer, configured to receive the set of signals and learn a set of features in the set of signals, and
- a second artificial neural network processing layer, configured to provide an output classification signal as a function of the set of features learned.

7. The method of claim 6, wherein the first artificial neural network processing layer comprises stacked-auto-encoder processing, comprising:
- a first encoder layer, configured to receive the set of signals and provide a first set of latent representations and a first subset of features of respective signals in the set of signals; and
- a second encoder layer, configured to receive the first set of latent representations and provide as output a second set of latent representations and a second subset of features of respective signals in the set of signals.

8. The method of claim 6, further comprising training the first artificial neural network processing layer to reduce errors between a set of reconstructed signals and the set of signals, preferably via a Kullback-Leibler Divergence, KLD, empirical risk minimization processing to provide the set of features in the set of signals.

9. The method of claim 6, further comprising training the first artificial neural network processing layer to reduce errors between a set of reconstructed signals and the set of signals via a Kullback-Leibler Divergence empirical risk minimization processing to provide the set of features in the set of signals.

10. The method of claim 6, wherein the second artificial neural network processing layer comprises clustering the set of signals by applying a set of softmax activation functions.

11. The method of claim 1, comprising generating the region of interest with a fixed size over the at least one subset of slice images in the time series of slice images.

12. The method of claim 1, comprising collecting the time series of slice images of medical imaging via Computer assisted Tomography.

13. The method of claim 1, comprising collecting the time series of slice images of medical imaging via Positron Emission Tomography.

14. A computer program product loadable in memory of at least one processing circuit and comprising software code portions for executing the steps of the method of claim 1 when the computer program product is run on the at least one processing circuit.

15. A system, comprising:
- a detector, configured to collect a time series of slice images via medical imaging; and
- processing circuitry coupled to the detector to receive the time series of slice images therefrom, the slice images comprising a region of interest located at a lung lesion, wherein the region of interest includes a set of points, the processing circuitry comprising artificial neural network processing circuits and configured to provide an output classification of the lung lesion with a method comprising:
  - tracking, over at least one subset of slice images in the time series of slice images, variations over time of at least one image parameter at the set of points in the region of interest, the variations over time of the at least one image parameter being indicative of dimensional variations of the lung lesion;
  - generating a set of signals indicative of tracked time variations of the at least one image parameter at respective points in the set of points;
  - applying classifier processing to the set of signals indicative of tracked time variations of the at least one image parameter at respective points in the set of points; and
  - generating a classification signal indicative of the set of signals indicative of tracked time variations of the at least one image parameter reaching or failing to reach at least one classification threshold.

16. The system of claim 15, wherein the detector comprises a silicon photomultiplier.

17. The system of claim 15, wherein the method further comprises selecting the at least one subset of slice images out of the time series of slice images as a function of position, size, or position and size of the lung lesion in at least one of the slice images in the time series of slice images.

18. The system of claim 15, wherein the time series of slice images includes grayscale images and the at least one image parameter includes luminance.

19. The system of claim 15, wherein applying classifier processing to the set of signals comprises applying artificial neural network processing to the set of signals.

20. A system comprising:
- a processor; and
- a memory coupled to the processor and storing instructions to cause the processor to perform a method comprising:
  - receiving a time series of slice images of medical imaging, the slice images comprising a region of interest located at a lung lesion, wherein the region of interest includes a set of points;
  - tracking, over at least one subset of slice images in the time series of slice images, variations over time of at least one image parameter at the set of points in the region of interest, the variations over time of the at least one image parameter being indicative of dimensional variations of the lung lesion;
  - generating a set of signals indicative of tracked time variations of the at least one image parameter at respective points in the set of points;
  - applying classifier processing to the set of signals indicative of tracked time variations of the at least one image parameter at respective points in the set of points; and
  - generating a classification signal indicative of the set of signals indicative of tracked time-variations of the at least one image parameter reaching or failing to reach at least one classification threshold.

* * * * *